L. Abbott.
Pipe Coupling.

Nº 89,373.          Patented Apr. 27, 1869.

WITNESSES
Gustave Dieterich
Wm A Morgan

INVENTOR
L. Abbott.
pr Munn & Co
attys.

United States Patent Office.

LEVI ABBOTT, OF LEWISTON, MAINE, ASSIGNOR TO HIMSELF AND EDWIN H. CUMMINGS, OF THE SAME PLACE.

Letters Patent No. 89,373, dated April 27, 1869.

IMPROVEMENT IN PIPE-COUPLING.

The Schedule referred to in these Letters Patent and making part of the same.

*To all whom it may concern:*

Be it known that I, LEVI ABBOTT, of Lewiston, in the county of Androscoggin, and State of Maine, have invented a new and improved Pipe-Coupling; and I do hereby declare that the following is a full, clear, and exact description thereof, which will enable those skilled in the art to make and use the same, reference being had to the accompanying drawings, forming part of this specification.

This invention relates to a new and useful improvement in coupling pipes, of lead, rubber, or other material; and It consists in a coupling, formed of a metallic core, and two annular grooves, applied to the pipe in the manner hereinafter described, and fastened with split rings.

Figure 1:
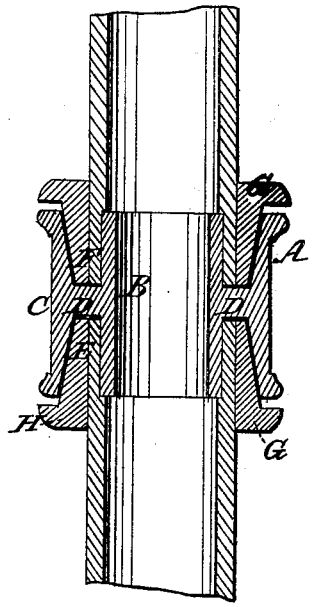

The drawing, Figure 1, represents two pieces of pipe, connected together by my coupling.

Figure 2:
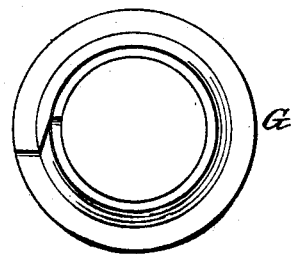

Figure 2 is a view of a split fastening-ring.

Similar letters of reference indicate corresponding parts.

A, represented by the blue color, is the core of the coupling.

It is formed of a central tube, B, and an outer cylindrical tube, C, connected with B by the flange D.

The spaces E and F receive the ends of the pipe to be coupled, and the fastening-rings G, as seen in the drawing.

The inner surface of the cylinder C, on each side of the flange D, is bevelling, and the outer surface of each of the fastening-rings is bevelled, to fit, as seen in the drawing, forming a sort of key-connection.

In applying the coupling, the ends of the pipe to be coupled are expanded sufficiently to allow them to pass over the tube B.

The fastening-rings G are split, or separated, as seen in fig. 2, so that they may be expanded sufficiently to compress the pipe, when they are driven into the recesses E F, with a mallet or other tool, and the fastening is complete.

H represents flanges on the rings, to facilitate their withdrawal, when required.

For withdrawing the ring, a wedge may be driven between the flange and the cylindrical part of the coupling C.

The annular spaces, or grooves E F, instead of being made semi-conical, or wedge-shaped, as represented in the drawing, may be square, or rectangular in form, or dovetailing, so as to hold any kind of packing around the pipe.

I claim as new, and desire to secure by Letters Patent—

In combination with metallic or other pipes, the coupling A, and the split fastening-rings G, arranged and applied substantially as and for the purposes described.

LEVI ABBOTT.

Witnesses:
EMERY O. BICKNELL,
EDWIN COBURN, Jr.